United States Patent [19]

Hirsch et al.

[11] 4,403,279
[45] Sep. 6, 1983

[54] VEHICULAR PLURAL VOLTAGE SYSTEM

[75] Inventors: Arthur E. Hirsch; Donnell L. Dunn, both of Terre Haute, Ind.

[73] Assignee: J. I. Case Company, Racine, Wis.

[21] Appl. No.: 317,169

[22] Filed: Nov. 2, 1981

[51] Int. Cl.³ .............................................. H02M 7/25
[52] U.S. Cl. .......................................... 363/60; 320/6
[58] Field of Search .................. 320/6, 15, 17, 39, 40, 320/50, 61; 363/59, 60

[56] References Cited

U.S. PATENT DOCUMENTS

| | | | |
|---|---|---|---|
| 4,008,429 | 2/1977 | Phalan | 363/60 X |
| 4,047,088 | 9/1977 | Himmler | 320/6 |
| 4,092,712 | 5/1978 | Harrigill, Jr. et al. | 363/60 |
| 4,210,856 | 7/1980 | Taylor | 363/59 X |
| 4,325,113 | 4/1982 | Tomlie, Jr. | 363/60 |

Primary Examiner—William M. Shoop
Attorney, Agent, or Firm—Dressler, Goldsmith, Shore, Sutker & Milnamow, Ltd.

[57] ABSTRACT

A precision regulated plural voltage system having particular application for vechicular electrical systems requiring dual voltage applications. The output of a voltage doubler is precisely regulated as a function of the regulated output voltage from the alternator. This precise regulation of the doubler output is provided automatically without having to manually adjust the output as a function of load or temperature, is provided inexpensively by use of a relatively few number of solid state circuit components, and produces the desired regulated doubles voltage output having the precise value desired as a function of the loads connected to the circuit.

3 Claims, 1 Drawing Figure

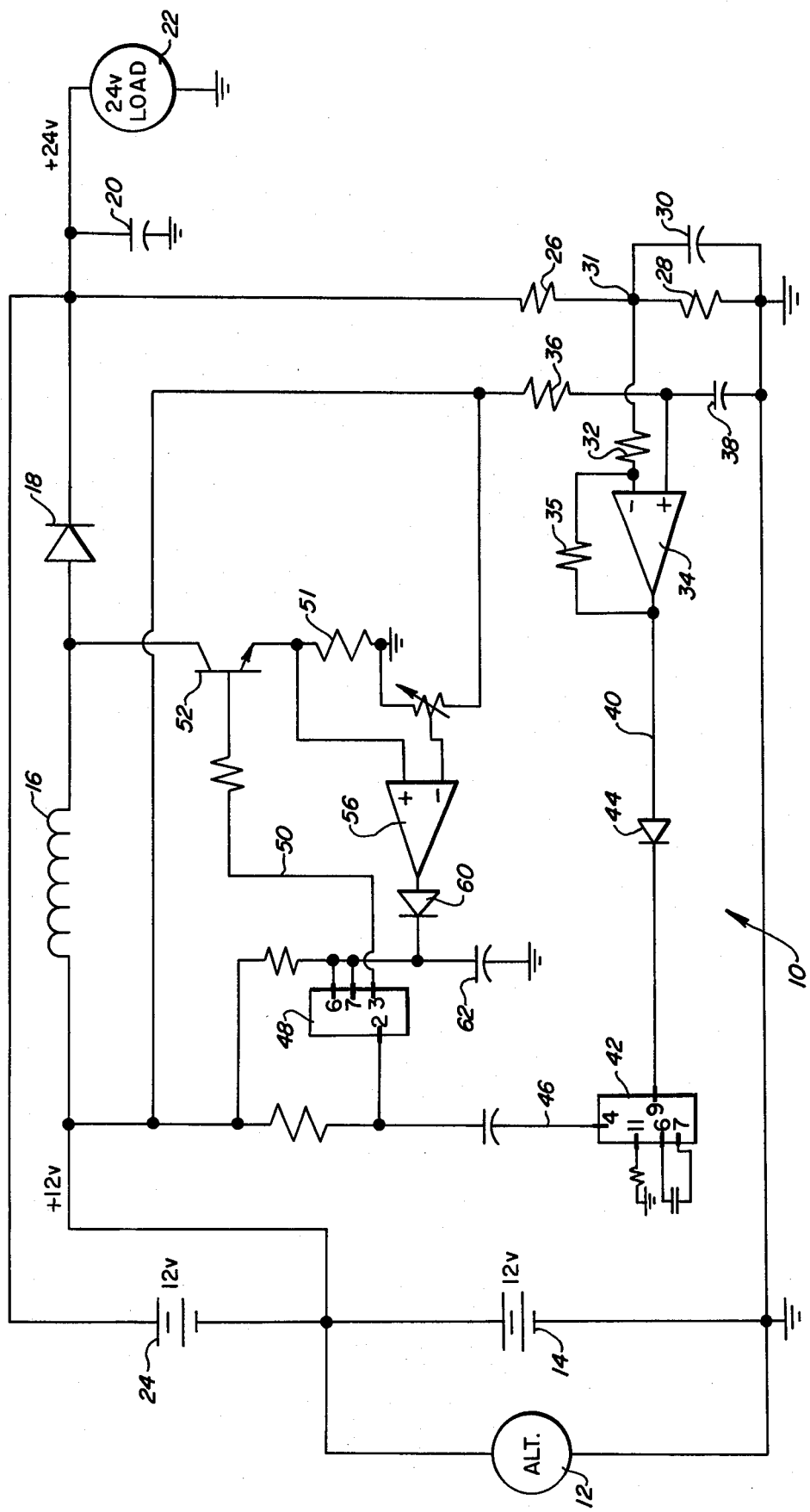

VEHICULAR PLURAL VOLTAGE SYSTEM

TECHNICAL FIELD

The present invention relates to plural voltage systems and more particularly to vehicular plural voltage systems for producing a precise, regulated output.

BACKGROUND

In many heavy duty vehicles, such as farm and industrial equipment, most of the electrical requirements are satisfied by a standard twelve-volt output. The starting system in such vehicles and sometimes other electrical equipment often require a 24-volt output.

In order to provide the higher voltage for the starter and other components which may require it, it is not unusual for vehicles to have an electrical system incorporating two sets of batteries connected in series. In such configurations, most of the electrical circuitry is connected across one of the batteries, the primary battery, while the starter system and any other higher voltage components are connected across both batteries, the primary battery and the secondary battery.

In vehicles, of course, it is necessary to maintain the batteries charged. This is usually accomplished by a regulated alternator connected across the battery. Such alternators are not inexpensive because typically they include not only the alternator itself but also the necessary rectification, temperature control, and voltage regulation for the alternator output.

The standard alternator is designed for use with a twelve-volt vehicular electrical system. Such alternators, of course, do not function to regulate a 24-volt output which exists in dual voltage systems described above. It is clear, therefore, that some means must be provided to establish the necessary regulated output for such a plural voltage system.

It would, of course, be possible to utilize a pair of twelve-volt alternator assemblies, one across each battery. This is not necessarily a satisfactory solution because of the added expense of the second alternator. As a result, it has been proposed to incorporate some type of voltage multiplier circuit for producing an increased output voltage. Typically, the voltage multiplier is a doubler producing a nominally 24-volt output from the nominally twelve-volt output of the regulated alternator.

Such doubler circuits, for example, are disclosed in Lovrenich U.S. Pat. No. 3,206,610, Campbell et al. U.S. Pat. No. 3,624,480, and Pfeffer et al U.S. Pat. No. 4,100,474.

The problem with such voltage doubler circuits is that the supposedly doubled output voltage is not necessarily the double of the original twelve-volt output of the regulated alternator. Furthermore, there is no regulation or at best inadequate regulation of the 24-volt output. The only regulation results from the fact that the input to the doubler is the regulated twelve-volt output of the alternator.

In the multi-voltage system disclosed in Pfeffer, the input for the voltage double is taken in part from one of the windings of the three-phase alternator. Unfortunately, not all alternators provide access to such a winding. In addition, if the load on that single winding is large, as it may be to operate the starter or to charge the secondary battery, the alternator becomes unbalanced which in itself could create a variety of problems as is well-known.

The doubler circuit in Pfeffer is not itself regulated. It merely relies on the existence of a regulated input thereto, i.e., the output of the alternator. Therefore, the charging voltage and current for the secondary battery are not truly regulated nor are they necessarily maintained at proper values.

It would be desirable, therefore, to be able to produce regulated plural output voltages of selected values from a regulated source, which could be usable with a variety of existing type alternators and which would not require any special connection thereto, which would be relatively inexpensive, particularly as compared to a second alternator assembly, and which would provide the desired regulated plural outputs.

SUMMARY OF THE INVENTION

In accordance with the present invention, there is provided a precision regulated plural voltage system having particular application for vehicular electrical systems requiring dual voltage applications. The precision regulated voltage system in accordance with the present invention provides the desired output without the necessity of utilizing a plurality of expensive alternator assemblies which have built-in rectification and regulation, and provides the desired output which is of a precise value and regulated as a function of the regulated input voltage—i.e., the output from the alternator- —and the load requirements.

Thus, in accordance with the present invention, there is provided a plural voltage system in which the output of the regulator is utilized as an input to the voltage multiplier, shown as a doubler, the output of which is a precise regulated voltage capable not only of being used for those loads which require higher voltage but of producing a precise regulated voltage for the purpose of charging any additional batteries connected to the output of the multiplier circuit.

More specifically, in accordance with the present invention there is provided a dual voltage system in which a regulated voltage is applied as an input to a voltage doubler. This input voltage is compared to the output voltage of the doubler or a fraction thereof. A feedback control signal is produced as a function of any difference from the desired relationship between the two signals compared.

Thus, the regulated output of the alternator is applied to the input of the doubler circuit. The output of the double circuit is applied to the 24 volt loads such as a starter and also is applied to the positive terminal of a secondary battery connected in series with the primary battery.

The doubled output is also connected across a voltage divider consisting of a pair of resistors having a selected resistance values, e.g., substantially equal resistances, so that the voltage at junction of the voltage divider has a selected fractional value, e.g., substantially one half, of the output of the doubler.

This fractional output is applied to one input of a differential amplifier or comparator. The other input to the comparator, the reference input, is the regulated output of the alternator, i.e., the input to the doubler. The output of the comparator or differential amplifier is a signal having a characteristic, e.g. amplitude, which varies as function of the difference between the two inputs. This output, a feedback error signal is applied to the input of a voltage controlled oscillator which produces an output in the form of a variable frequency pulse train, the frequency of which varies as a function of the magnitude of the error signal.

The variable frequency pulse train is applied to a trigger input of a control circuit which produces a control signal in the form of a variable frequency, fixed amplitude, fixed pulse width pulse train which controls the value of the voltage output of the doubler circuit. Thus, as the magnitude of the error signal increases thereby increasing the frequency of the voltage controlled oscillator, the number of pulses produced by the trigger circuit increases per unit of time to increase the amplitude of the doubler output. Conversely, when the magnitude of the error signal decreases the frequency of pulses also decreases thereby allowing the doubler output to decrease.

Thus, there is provided a voltage doubler circuit the output of which is precisely regulated as a function of the charge on the second battery and as a function of the input voltage thereto, i.e., the regulated output voltage from the alternator. This precise regulation of the doubler output is provided automatically without having to manually adjust the output as a function of load or temperature, is provided inexpensively by use of a relatively few number of solid state circuit components, and produces the desired regulated doubler voltage output having the precise value desired as a function of the loads connected to the circuit.

Thus, in accordance with the present invention there is provided a doubler circuit having particular application in vehicles requiring a multiple voltage system in which both the primary voltage and the doubled secondary voltage are precisely regulated as required by the state of the batteries, the load and the drain on the circuit.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWING

The single FIGURE of the drawing discloses the regulated doubler circuit incorporating the present invention.

DESCRIPTION OF PREFERRED EMBODIMENT

While this invention is susceptible of embodiment in many different forms, there is known in the drawing and will be described herein in detail a specific embodiment thereof with the understanding that the present disclosure is to be considered as an exemplification of the principles of the invention and is not intended to limit the invention to the specific embodiment illustrated.

Referring now to the drawing, there is shown a regulated voltage doubler circuit 10 incorporating the present invention. The input to the circuit 10 is provided by the D.C. regulated output of an alternator 12 which typically incorporates therein the usual built in rectification, temperature control and voltage regulation. The regulated output of the alternator 12 is connected across a primary 2 volt battery 14 and the input of the doubler circuit 10.

The doubler circuit 10 includes an inductor 16 connected in series with a fast recovery diode 18, such as a Schottky diode, and a capacitor 20 one end of which is connected to the cathode of the diode and the other side of which is connected to ground. This type of voltage doubler circuit is known in the art and need not be described here in detail. In general, however, each time the field in the inductor 16 is allowed to collapse, the diode 18 is forward biased to increase the charge on the capacitor 20 and, therefore, the output voltage of the circuit 10.

The output of the doubler circuit shown is generally a 24 volt output with respect to ground and may conveniently be connected across those electrical loads, such as a vehicle starter 22, which require the 24 volt output. The output of the doubler 10 is also connected to the positive side of a secondary battery 24 the negative side of which is connected to the positive side of the primary battery 14. Thus the two batteries are connected in series to provide the desired 24 volt output.

In order to assure that the 24 volt output is appropriately regulated for the purpose of charging the secondary battery 24, the output capacitor 20 is connected across a voltage divider formed by a pair of resistors 26, 28 connected in series. For a doubler, the resistance of each of the two resistors is equal so that the voltage drop across each is equal, i.e., the voltage across resistor 28 is equal to about 12 volts, substantially one half of the doubled output voltage. A filter or smoothing capacitor 30 is connected across the second resistor 28 of the voltage divider.

The junction 31 of the voltage divider is connected through a current limiting resistor 32 to a test or negative input of a differential operational amplifier or comparator 34 having a negative feedback resistor 35. Resistors 32 and 35 determine the gain of comparator 34. The reference or plus input to the comparator 34 is the regulated output of the alternator 12 which is also the input to the doubler circuit 10 applied through a limiting resistor 36 and across an appropriate filter or smoothing capacitor 38.

The output 40 of the differential amplifier or comparator 34, i.e, the feedback error signal, is applied to the input of a voltage controlled oscillator 42 through a diode 44. The voltage controlled oscillator 42 produces a series of fixed amplitude pulses, the frequency of which varies as a function of the magnitude of the error signal on line 40. The pulse train output 46 of the voltage control oscillator 42 is applied to the trigger input of a mono-stable multi-vibrator 48. Each time a pulse on line 40 is applied to the trigger input of the multi-vibrator 48, a fixed duration, fixed amplitude output pulse is produced on line 50. Thus the control output 50 of the multi-vibrator 48 is a pulse train the frequency of which corresponds to the frequency of the output 46 of voltage controlled oscillator 42 which in turn is a function of the magnitude of the feedback error signal output 40 of the differential amplifier 34.

The pulse train control output 50 of the multi-vibrator 48 is applied to the base of a trigger transistor 52 connected between the voltage doubler inductor 16 and diode 18. The transistor 32 is rendered conductive in response to the pulse to thereby short the inductor to ground. When transistor 32 then ceases conducting, the collapsing field in the inductor forward biases diode 18 to charge capacitor 20.

The emitter of the control transistor 52 is connected to ground through resistor 54. One input of a current limiting circuit consisting of a differential amplifier 56 is connected to resistor 54. The other input to differential amplifier 56 is the input voltage connected across a variable resistor 58. If the current through limiting resistor 54 is too great, differential amplifier 56 produces an output through diode 60 to rapidly charge timing capacitor 62 to terminate the pulse output of multivibrator 48 earlier than normal. This limits the current which passes through the inductor 16.

If the second value, i.e. one half, of the doubled output has a value which is larger than the reference value, namely the regulated output of the alternator, the magnitude of the error signal 40 is decreased. As a result, the frequency of the pulse train output of the voltage control oscillator 42 decreases. This change in frequency reduces the frequency of the pulse train output 50 of the multi-vibrator 48, and the control transistor 52 is switched on and off at a lower rate. This allows the doubled output to decrease in value thus lowering the value of the feedback signal applied to the differential amplifier. This in turn increases the magnitude of the error signal thus increasing the frequency of the various control pulse trains to increase the value of the doubled voltage until the desired value is obtained.

Thus, in accordance with the present invention, the magnitude of the doubled output is sensed to produce a feedback signal compared to a reference, the regulated output of the alternator. When the desired relationship between the two signals exist, an error signal is produced thereby allowing the doubled output to remain unchanged. If the value of the doubled output is too high relative to the input, the frequency of the pulse train is decreased thus lowering the value of the doubled output voltage. If the value of a voltage is too low the magnitude of the error signal increases to increase the frequency thereby increasing the value of the doubled voltage.

As a result the regulated doubling circuit incorporating the present invention is capable of producing not only a doubled voltage for use as desired in a dual voltage system such as may be required for heavy duty industrial vehicles, but produces a precisely regulated doubled voltage by utilizing and comparing value of that voltage to the regulated output of the alternator. This insures that the values of both of those signals tend to maintain a preselected relationship therebetween.

The feedback circuit comparing the output of the doubler circuit to the input, and the error signal produced as part of the feedback circuit to control the value of the doubler output does not require manual intervention or a large number of expensive parts such as duplicate regulators or alternators.

The circuit of the present invention produces the desired regulated double output with a high degree of reliability, at relatively minimal cost and may be incorporated simply into the variety of electrical systems.

The doubler current incorporating the present invention does not require access to any special terminal on the alternator, does not unbalance the alternator because of connections to a single phase winding, is responsive to the regulated DC output of the alternator and loads connected thereto for producing a regulated doubled output voltage having a selected, precise and controlled relationship to the alternator output.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A vehicular electrical system for producing an output voltage having a selected value greater than the value of a source voltage comprising:

first circuit means connected to said source voltage and capable of producing an output voltage having a selected value greater than the value of said source voltage;

means for sensing the value of said output voltage and for producing a feedback signal having a characteristic which varies as a function of the difference between the sensed value of said output voltage and the selected value thereof;

said sensing means including comparison means for comparing the sensed value of said output voltage to a reference value, said comparison means producing said feedback signal having a magnitude which varies as a function of the difference between the sensed value of the output voltage and said reference value, said reference value being said source voltage and said sensed value of said output voltage being a fraction thereof;

control circuit means connected to said first circuit means for controlling the operation thereof in response to said feedback signal for varying the value of said output voltage as a function of said characteristic of said feedback signal to maintain said output voltage substantially at said selected value; and circuit means connected to said output voltage for producing a sensing voltage which is substantially equal to one half of said output voltage;

said comparison means being connected to said circuit means for comparing said sensing voltage to said source voltage;

whereby the selected value of said output voltage is substantially double the value of said source voltage.

2. An electrical system as claimed in claim 1 wherein: said control circuit means provides a control signal having a characteristic which varies as a function of the magnitude of said feedback signal and includes means for applying said control signal to said first circuit means to vary the output voltage as a function of said characteristic of said control signal.

3. An electrical system as claimed in claim 2 wherein said control circuit means includes switching means responsive to said control signal to switch at a rate which varies as a function of said characteristic of said control signal.

* * * * *